(No Model.)
C. S. RUEF.
DISK HARROW.
No. 408,196. Patented July 30, 1889.
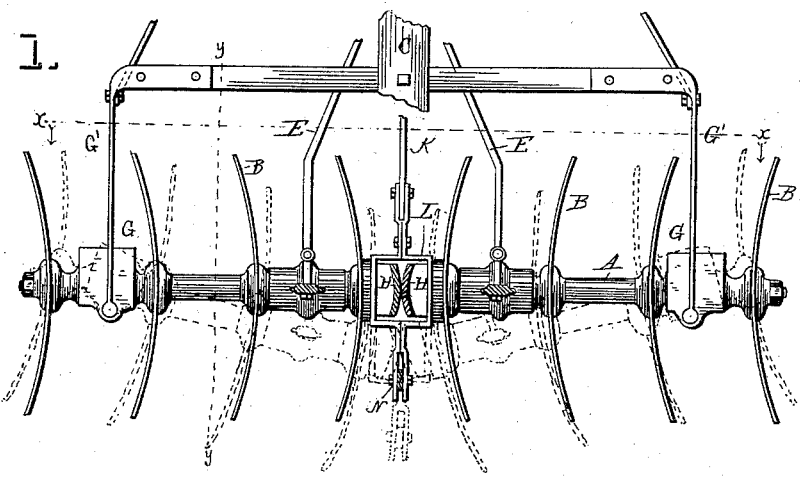
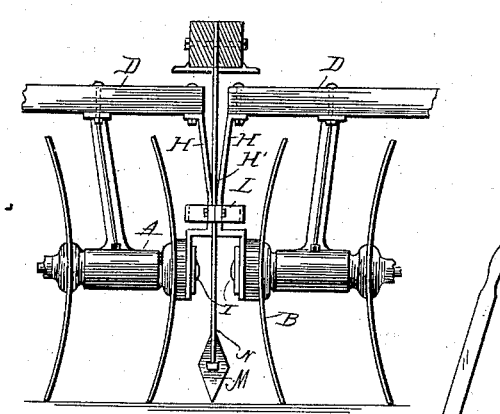
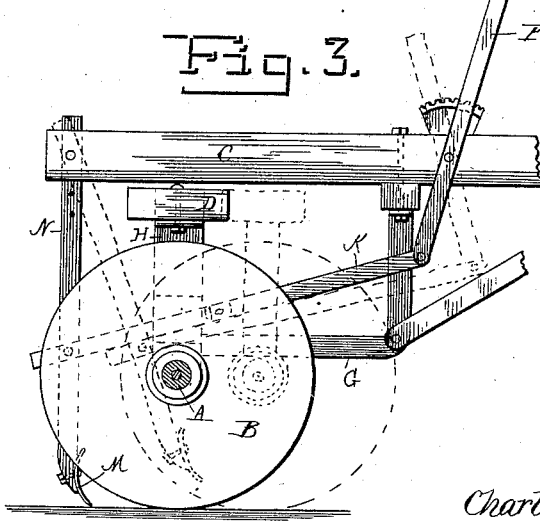
Witnesses
Wm T. Robertson
Kate P. Robertson
Inventor
Charles S. Ruef
By his Attorney
John G. Manahan.

UNITED STATES PATENT OFFICE.

CHARLES S. RUEF, OF DIXON, ILLINOIS, ASSIGNOR TO THE GRAND DETOUR PLOW COMPANY, OF SAME PLACE.

DISK HARROW.

SPECIFICATION forming part of Letters Patent No. 408,196, dated July 30, 1889.

Application filed March 23, 1889. Serial No. 304,476. (No model.)

*To all whom it may concern:*

Be it known that I, CHARLES S. RUEF, a citizen of the United States, residing at Dixon, in the county of Lee and State of Illinois, have invented certain new and useful Improvements in Disk Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to improvements in disk harrows; and it consists more particularly in a novel construction of bumpers upon the inner ends of the disk-frame, in mechanism to resist the separation of said gangs in the operation of backing the implement, and in interposing between the inner ends of the disk-gangs an adjustable shovel to cut the otherwise untouched center between said disk-gangs.

As my invention is limited to the matters before mentioned, and is applicable to any of the well-known forms of disk harrows of this class, and the construction and operation of the residue of the harrow can be made in any of the well-known types, I do not deem it necessary to show or describe the implement in detail, nor the parts thereof, any further than will render intelligible the mode of attachment and operation of the parts constituting my invention.

In the drawings, Figure 1 is a horizontal section of a portion of a disk harrow embodying my invention.

My invention pertains to that class of disk harrows in which the earth is thrown from the center, and in which, therefore, the inner ends of the disk-gangs project diagonally to the rear when in a working condition.

In Fig. 1 the working position aforesaid of the disk-gangs is shown in dotted lines, and the position of the disks for backing or for transportation is shown in heavy lines, the two disk-gangs being then on substantially the same line.

Fig. 2 is a cross-section on the line $x$ $x$ of Fig. 1. Fig. 3 is a longitudinal vertical section on the line $y$ $y$ of Fig. 1.

A A are the disk-gangs, in which the disks B are seated in any of the usual modes.

C is the tongue.

D D are the usual gang-planks, to which the gangs A are attached by the usual brackets.

E E are gang-adjusting rods attached at their rear ends near the inner ends of the disk-gangs A, and attached at their front ends to the usual hand-lever F, by means of which the different positions of the disk-gangs in a horizontal plane are regulated by throwing the inner ends of said gangs forward or back, the said gangs having their pivotal movements at the usual outer brackets G, which are held by forwardly-extending braces G', connected rigidly to the tongue C. The tendency of these "throw-out" disk-gangs is to crowd toward the center and thereby create excessive friction in their bracket-bearings. To avoid this, I provide two bumpers H, one upon each of the inner ends of the disk-gangs, which are shown in cross-sections in Fig. 1 and in vertical rear view in Fig. 2. The bumpers H are of the same conformation, and are respectively collared at their lower ends upon the inner end of the axle I of the disk-gangs, and are bent inward slightly above said disk-gangs, so as to form opposing faces H'. Above the opposing faces H' the bumpers H are diverged slightly outward and extended upward, and are suitably attached to the inner ends of the gang-planks D. The opposing faces H' of the bumpers H mutually receive and resist the aforesaid inward pressure of the disk-gangs, and thereby relieve the bracket-hangings therefrom, and in conjunction with the link L, hereinafter named, hold the gangs from separating when backing.

If the implement is backed when the disks are in a working position, the tendency is to violently separate said disks and injure or break their fastenings, and to provide against an accident of this kind I form the rod K, which actuates the shovel M, as hereinafter mentioned, at the proper location into a link L, which incloses the bumpers H at their point of junction, the bumpers being shaped to conform to said link or collar.

The link L is seated around the bumpers H sufficiently loose to permit the necessary play of said bumpers in the process of throwing the disk-gangs forward and back and to permit the vertical oscillation of said gangs.

As the disk-gangs are required to be operated at an angle with each other, as aforesaid, and the "throw" of each disk is from the center, it results, in the usual constructions, that there is a strip of ground between the inner ends of the disk-gangs which is uncultivated. It would naturally occur that this difficulty might be obviated by the introduction of an ordinary shovel at this point, but the difficulty therein has been that the shifting of the gangs or the backing or transportation of the implement over hard or uncultivated ground would destroy such shovel or its appendages. To obviate this objection is one of the departments of my present invention. I provide an ordinary cultivator plate or shovel M, and attach the same in any of the usual modes to the lower end of a vertical arm N, the upper end of which is pivotally seated on the rear end of the tongue C. The rod K, before mentioned, is pivotally attached at its front end, at the proper location, to the lower portion of the shifting-lever F, and is pivoted at its rear end to the vertical arm N intermediate the shovel M and the upper pivotal seat of said arm. The length of the rod K and its attachment to the lever F are such that when the disk-gangs are thrown back in their position the arm N is also thrown nearly vertical, as shown by the heavy lines in Fig. 3, and is there held by means of the usual locking of said lever F. In this position of the arm N the shovel M extends a sufficient distance into the ground to have its practical operation. A series of holes may be formed in the upper end of the arm N, and by the pivoting of said arm optionally through any one thereof the depth of cut of said shovel M may be adjusted. When the upper end of the lever F is drawn backward, as shown in dotted lines in Fig. 3, for the purpose of bringing the disk-gangs into line with each other to back or transport the implement, the same movement draws the arm N forward and the shovel M out of engagement with the earth, in which position it is held by the same lock of the lever F which holds the disk-gangs, and said shovel is thereby suspended above the surface of the ground in position to be uninjured by the backing or transportation aforesaid of the implement.

What I claim as my invention, and desire to secure by Letters Patent of the United States, is—

1. In a disk harrow, in combination with the gang-planks D D and disk-gangs A A, the bumpers H H, attached at their upper ends to said gang-planks and collared at their lower ends on the inner ends, respectively, of said disk-gangs, and provided intermediately with the opposing faces H', substantially as shown, and for the purpose described.

2. In a disk harrow, the combination of the gang-planks D D, disk-gangs A A, the bumpers H H, attached at their upper ends to said gang-planks and collared at their lower ends on the inner ends, respectively, of said disk-gangs, and provided intermediately with the opposing faces H', and the link L, adapted to loosely inclose said bumpers and limit the separation of said gangs, substantially as shown, and for the purpose described.

3. In combination with the gangs of a disk harrow, the bumpers H H, formed, respectively, upon the inner ends thereof, the shovel M, the pivotally-seated arm N, the rod K, provided with the link L, encircling said bumpers, and the actuating and adjusting lever F, substantially as shown, and for the purpose described.

4. In combination, with the gangs of a disk harrow, the bumpers H H, attached, respectively, to the inner ends of said gangs, the rod K, provided with the link L, encircling said bumpers, and the actuating and adjusting lever F, substantially as shown, and for the purpose described.

In testimony whereof I affix my signature in presence of two witnesses.

CHARLES S. RUEF.

Witnesses:
 WILLIS E. SKIFF,
 ELLIS C. HAMPTON.